US011898714B2

(12) United States Patent
Li et al.

(10) Patent No.: US 11,898,714 B2
(45) Date of Patent: Feb. 13, 2024

(54) VEHICLE LAMP OPTICAL ASSEMBLY WITH PRIMARY AND SECONDARY OPTICAL UNITS

(71) Applicant: HASCO VISION TECHNOLOGY CO., LTD., Shanghai (CN)

(72) Inventors: Meng Li, Shanghai (CN); Xiangqian Chen, Shanghai (CN); Zhaoyu Chen, Shanghai (CN); Ying Li, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/928,430

(22) PCT Filed: Mar. 26, 2021

(86) PCT No.: PCT/CN2021/083317
§ 371 (c)(1),
(2) Date: Nov. 29, 2022

(87) PCT Pub. No.: WO2022/001239
PCT Pub. Date: Jan. 6, 2022

(65) Prior Publication Data
US 2023/0213161 A1 Jul. 6, 2023

(30) Foreign Application Priority Data
Jul. 2, 2020 (CN) ......................... 202010633980.4

(51) Int. Cl.
*F21S 41/24* (2018.01)
*F21W 102/135* (2018.01)

(52) U.S. Cl.
CPC ........ *F21S 41/24* (2018.01); *F21W 2102/135* (2018.01)

(58) Field of Classification Search
CPC ............................ F21S 41/04; F21W 2102/13
See application file for complete search history.

(56) References Cited

U.S. PATENT DOCUMENTS 5,438,485 A 8/1995 Li et al.
10,054,279 B2 * 8/2018 Kliebisch ............. F21S 41/285
(Continued)

FOREIGN PATENT DOCUMENTS

CN 209484477 U 10/2019
CN 210179517 U 3/2020
(Continued)

OTHER PUBLICATIONS

International Search Report, China national Intellectual Property Administration, Application No. PCT/CN2021/083317, dated Jun. 25, 2021, 4 pages, English Translation, 3 pages.
(Continued)

*Primary Examiner* — Robert J May
(74) *Attorney, Agent, or Firm* — Ziegler IP Law Group

(57) ABSTRACT

A vehicle lamp optical assembly includes a primary optical unit having a plurality of primary optical units arranged side by side. The primary optical unit has a light entrance portion and a light guide portion. The light guide portion has a light entrance portion mounting surface and a primary light emission surface. The light entrance portion mounting surface has at least one light entrance portion. The light entrance portion is configured to enable incident light to be converged and emitted to the light guide portion, and the light guide portion is configured to guide the incident light to be emitted from the primary light emission surface; and a secondary optical unit. The secondary optical unit has a secondary light emission surface and a secondary light entrance surface corresponding to the primary light emission (Continued)

surface. The secondary light emission surface is a narrow and long smooth curved surface.

19 Claims, 8 Drawing Sheets

(56) References Cited

U.S. PATENT DOCUMENTS

| | | | | |
|---|---|---|---|---|
| 10,228,108 | B2 * | 3/2019 | Courcier | F21S 41/143 |
| 2017/0089536 | A1 * | 3/2017 | Courcier | F21S 41/20 |
| 2018/0087745 | A1 * | 3/2018 | Gromfeld | F21V 7/06 |

FOREIGN PATENT DOCUMENTS

| | | | |
|---|---|---|---|
| CN | 210601445 | U | 5/2020 |
| CN | 210740266 | U | 6/2020 |
| CN | 212618082 | U | 2/2021 |
| EP | 1748251 | A1 | 1/2007 |
| EP | 3299703 | A1 | 3/2018 |
| JP | 4323468 | B2 | 9/2009 |
| WO | 2019229191 | A1 | 12/2019 |
| WO | 2020021825 | A1 | 1/2020 |
| WO | 2020025171 | A1 | 2/2020 |

OTHER PUBLICATIONS

Written Opinion of the Searching Authority, China National Intellectual Property Administration, Application No. PCT/CN2021/083317, dated Jun. 21, 2021, 4 pages.

China Patent Office, Written Opinion of the International Searching Authority, Application No. PCT/CN2021/083317, dated Jun. 25, 2021, 4 pages.

European Patent Office, Communication Pursuant to Article 94(3) EPC, Application No. 218329084, dated Jun. 14, 2023, 41 pages.

European Patent Office, Supplementary European Search Report, Application No. 218329084, dated Jun. 2, 2023, 3 pages.

* cited by examiner

A-A

B-B

VEHICLE LAMP OPTICAL ASSEMBLY WITH PRIMARY AND SECONDARY OPTICAL UNITS

CROSS-REFERENCE TO RELATED APPLICATIONS

The present application claims benefits of Chinese Patent Application No. 202010633980.4, filed on Jul. 2, 2020, the content of which is incorporated herein by reference.

TECHNICAL FIELD

The aspects of the disclosed embodiments relate to a vehicle lamp, and particularly to a vehicle lamp optical assembly. In addition, the aspects of the disclosed embodiments further relate to a vehicle lamp module, a vehicle lamp and a vehicle.

BACKGROUND ART

Currently, in an illumination optical system of a vehicle lamp of a vehicle, there are mainly two types of implementation for high and low beams called lens-type and reflection-type. A reflection-type illumination system includes a light source and a reflector, wherein light emitted by the light source directly passes through an external lens to form illumination light of a vehicle after reflected by the reflector; a lens-type illumination system includes a light source, a reflector and a lens, wherein light emitted by the light source is reflected by the reflector, then is imaged by the lens and finally forms the high and low beams required by vehicle illumination by an external lens.

The above lens-type or reflection-type illumination system has a single form and is limited by the size of the lens or the reflector, and it is quite difficult for a vehicle-lamp high and low beam module thereof to have a quite small opening (the opening of the vehicle-lamp high and low beam module refers to the height of a light emission side of the module), such that more miniaturized and diversified design of the vehicle lamp in size and shape cannot be realized.

SUMMARY

The technical problem to be solved by the first aspect of the present disclosure is to provide a vehicle lamp optical assembly, which can realize the design of miniaturization and shape diversification.

The technical problem to be solved by the second aspect of the present disclosure is to provide a vehicle lamp module, which can realize the design of size miniaturization and shape diversification.

The technical problem to be solved by the third aspect of the present disclosure is to provide a vehicle lamp, which can realize the design of size miniaturization and shape diversification.

The technical problem to be solved by the fourth aspect of the present disclosure is to provide a vehicle, which can realize the design of shape diversification.

In order to solve the above technical problems, a first aspect of the present disclosure provides a vehicle lamp optical assembly, comprising: a primary optical unit or a primary optical unit group having a plurality of primary optical units arranged side by side, wherein the primary optical unit includes a light entrance portion and a light guide portion, the light guide portion has a light entrance portion mounting surface and a primary light emission surface, the light entrance portion mounting surface is provided with at least one light entrance portion, the light entrance portion is configured to enable incident light to be converged and emitted to the light guide portion, and the light guide portion is configured to guide the incident light to be emitted from the primary light emission surface; and a secondary optical unit, wherein the secondary optical unit has a secondary light emission surface and a secondary light entrance surface corresponding to the primary light emission surface, and the secondary light emission surface is a narrow and long smooth curved surface.

Preferably, the light guide portions of the plurality of primary optical units in the primary optical unit group are connected into a whole, an auxiliary light source is provided on at least one side of the primary optical unit or the primary optical unit group in the left-right direction of the light guide portion, and light emitted by the auxiliary light source enters from a side surface of the light guide portion and is emitted from the primary light emission surface.

Preferably, a light converging structure is provided between the auxiliary light source and the light guide portion.

Preferably, a longitudinal sectional line of the secondary light emission surface is an arc line protruding forwards, and a transverse sectional line of the secondary light emission surface is a straight line or a curve extending in the left-right direction.

Preferably, the light entrance portion is of a light converging cup structure, and an outer contour surface of the light entrance portion is a curved surface with a diameter gradually increased from rear to front.

Preferably, each of an upper surface and a lower surface of the light guide portion is provided with a pattern structure or a plated film.

Preferably, the primary optical unit is a low-beam inflection-point primary optical unit, a low-beam widening primary optical unit or a high-beam primary optical unit; and the primary optical unit group includes at least one or more of the low-beam inflection-point primary optical unit, the low-beam widening primary optical unit and the high-beam primary optical unit.

Preferably, the primary optical unit group includes a low-beam inflection-point primary optical unit, a low-beam widening primary optical unit, and a high-beam primary optical unit, and the low-beam widening primary optical unit is provided between the low-beam inflection-point primary optical unit and the high-beam primary optical unit.

Preferably, the light guide portion of the low-beam inflection-point primary optical unit is a low-beam light guide portion, the primary light emission surface thereof is a low-beam primary light emission surface, the secondary light entrance surface corresponding to the low-beam primary light emission surface includes at least one low-beam secondary light entrance surface, the low-beam secondary light entrance surface is a curved surface protruding backwards, the low-beam secondary light entrance surfaces are in one-to-one correspondence to the light entrance portions, and a low-beam inflection-point cut-off line structure for forming a low-beam inflection-point cut-off line is provided on a front boundary of a lower surface of the low-beam light guide portion.

Preferably, the low-beam inflection-point cut-off line structure includes at least one left-hand-driving cut-off line structure, or at least one right-hand-driving cut-off line structure, or at least one left-hand-driving cut-off line structure and at least one right-hand-driving cut-off line structure, and the left-hand-driving cut-off line structures and the right-hand-driving cut-off line structures are in one-to-one correspondence to the light entrance portions.

Preferably, a III-region structure for forming a low-beam III-region light shape is provided at a lower portion of a front end of the low-beam light guide portion, wherein the III-region structure, a lower surface of the low-beam light guide portion and a rear end of the low-beam light guide portion form an upwardly concave groove, and the low-beam inflection-point cut-off line structure is formed at a junction between the III-region structure and a top of the groove.

Preferably, the light guide portion of the low-beam widening primary optical unit is a low-beam widening light guide portion, the low-beam widening light guide portion and the secondary optical unit are connected into a whole, and a low-beam widening cut-off line structure for forming a low-beam widening cut-off line is provided on a lower surface of the low-beam widening light guide portion.

Preferably, a III-region structure for forming a low-beam III-region light shape is provided at a lower portion of a front end of the low-beam widening light guide portion, the III-region structure, a lower surface of the low-beam widening light guide portion and a rear end of the low-beam widening light guide portion form an upwardly concave groove, and the low-beam widening cut-off line structure is formed at a junction between the III-region structure and a top of the groove.

Preferably, the light guide portion of the high-beam primary optical unit is a high-beam light guide portion, the primary light emission surface thereof is a high-beam primary light emission surface, the secondary light entrance surface corresponding to the high-beam primary light emission surface includes at least one high-beam secondary light entrance surface, the high-beam secondary light entrance surface is a curved surface protruding backwards, and the high-beam secondary light entrance surfaces are in one-to-one correspondence to the light entrance portions.

Preferably, the primary optical unit is a low-beam inflection-point primary optical unit, a low-beam widening primary optical unit or a high-beam primary optical unit, and the primary optical unit group includes at least one or more of the low-beam inflection-point primary optical units, the low-beam widening primary optical units and the high-beam primary optical units; the light guide portion of the low-beam inflection-point primary optical unit is a low-beam light guide portion, the light guide portion of the low-beam widening primary optical unit is a low-beam widening light guide portion, a III-region structure for forming a low-beam III-region light shape is provided at each of lower portions of front ends of the low-beam light guide portion and the low-beam widening light guide portion, and a concave-convex structure is provided on a III-region light entrance surface of the III-region structure.

Preferably, an auxiliary light source is provided on a side surface of the III-region structure of the low-beam light guide portion or the low-beam widening light guide portion.

A second aspect of the present disclosure further provides a vehicle lamp module, including the vehicle lamp optical assembly according to the first aspect and at least one light source, wherein the light sources are in one-to-one correspondence to the light entrance portions.

Preferably, each of the light sources can be independently controlled to be turned on or off.

A third aspect of the present disclosure further provides a vehicle lamp, including the vehicle lamp module according to the second aspect.

A fourth aspect of the present disclosure further provides a vehicle, including the vehicle lamp according to the third aspect.

In the present disclosure, by configuring the secondary light emission surface as a narrow and long smooth curved surface without a section difference and arranging the light entrance portion and the light guide portion, the vehicle lamp optical assembly can have a quite small overall vertical height, thereby realizing a miniaturization design in size of a small opening; the secondary light emission surface has various shapes and high adaptability, so that shape requirements of different vehicle lamps may be met, and a diversification design in shaping is realized.

Other features and advantages of the present disclosure will be described in detail in the following detailed description.

REFERENCE NUMERALS

| | |
|---|---|
| 1 low-beam inflection-point primary optical unit | 11 low-beam light guide portion |
| 111 low-beam primary light emission surface | 12 low-beam inflection-point cut-off line structure |
| 121 left-hand-driving cut-off line structure | 122 right-hand-driving cut-off line structure |

-continued

| | |
|---|---|
| 2 low-beam widening primary optical unit | 21 low-beam widening light guide portion |
| 3 high-beam primary optical unit | 31 high-beam light guide portion |
| 311 high-beam primary light emission surface | 4 secondary optical unit |
| 41 secondary light emission surface | 42 secondary light entrance surface |
| 421 low-beam secondary light entrance surface | 422 high-beam secondary light entrance surface |
| 5 light entrance portion | 6 III-region structure |
| 61 III-region light entrance surface | 611 concave-convex structure |
| 7 groove | 8 light converging structure |
| a low-beam central region light shape | a1 low-beam inflection-point cut-off line |
| b high-beam light shape | c low-beam widening region light shape |
| c1 low-beam widening cut-off line | |

DETAILED DESCRIPTION

Figure 1:
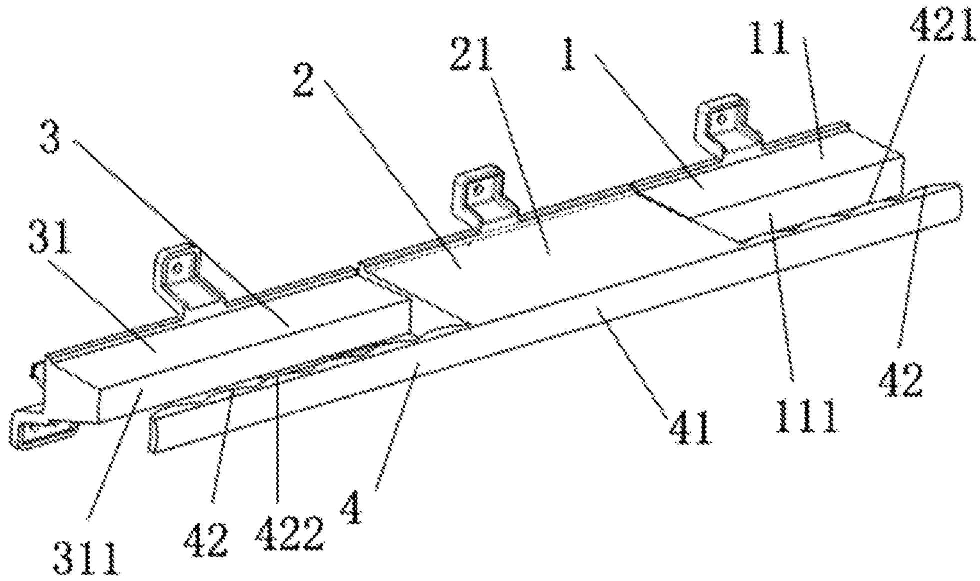
FIG. 1 is a schematic front perspective structural diagram according to an embodiment of the present disclosure.
Figure 2:
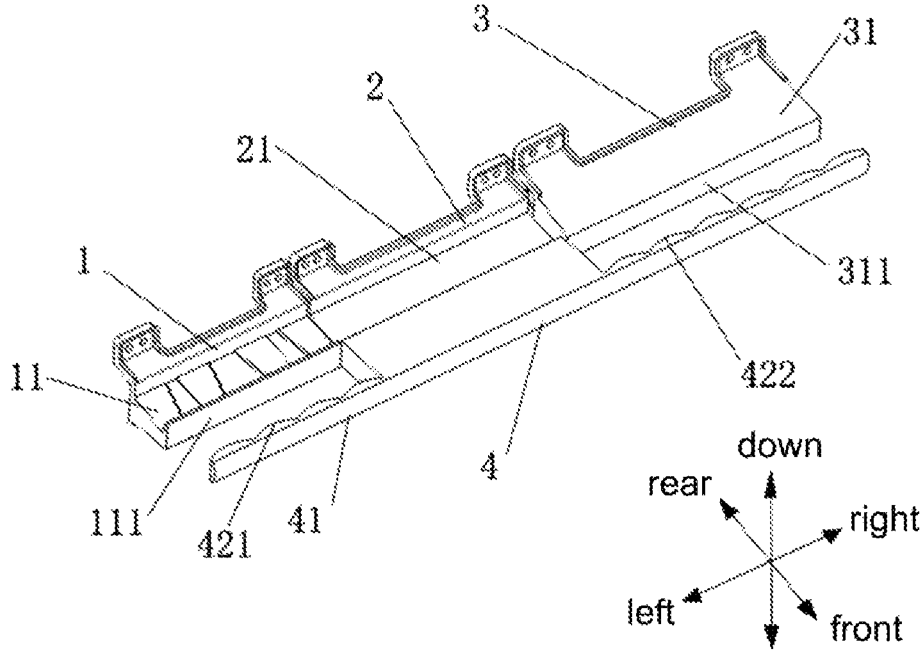
FIG. 2 is a first schematic back perspective structural diagram according to an embodiment of the present disclosure.
Figure 3:
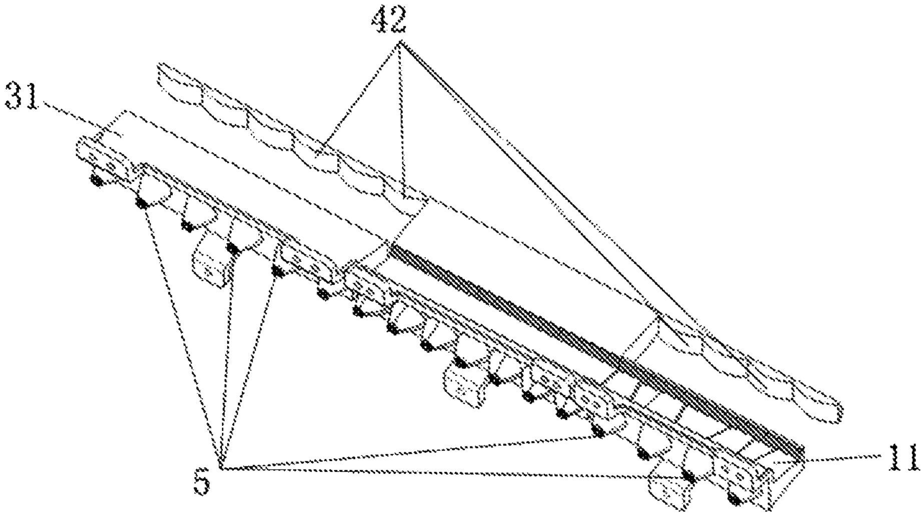
FIG. 3 is a second schematic back perspective structural diagram according to an embodiment of the present disclosure.
Figure 4:
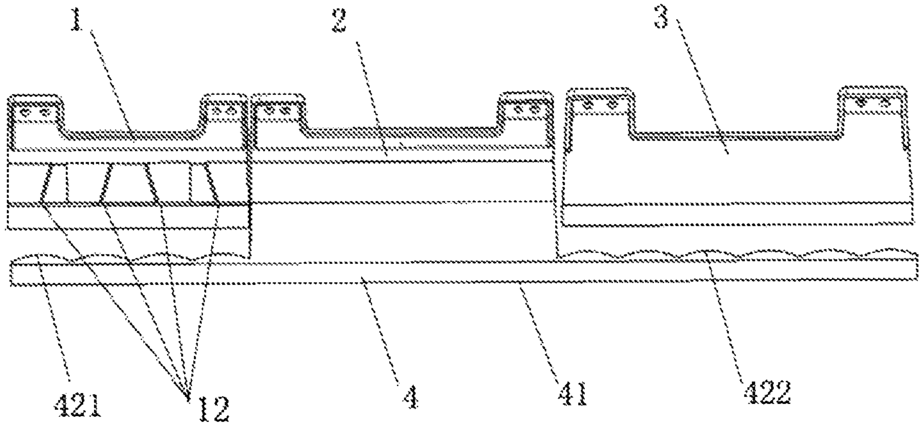
FIG. 4 is a third schematic back perspective structural diagram according to an embodiment of the present disclosure.

In descriptions of the present disclosure, it should be understood that, orientations or positional relationships indicated by terms "upper", "lower", "front", "rear", "left", "right" etc. are based on orientations or positional relationships shown in FIG. 2, and they are only used to facilitate the description of the present disclosure and simplify the description, but do not indicate or imply that an indicated device or element must have a specific orientation or be constructed and operated in a specific orientation. Therefore, it cannot be understood as a limitation on the present disclosure.

Embodiments of the present disclosure will be described in detail below with reference to the accompanying drawings. It should be understood that the specific embodiments described herein are merely for illustrating and explaining the present disclosure and are not intended to limit the present disclosure.

As shown in FIGS. 1 to 16, the present disclosure provides a vehicle lamp optical assembly, comprising: a primary optical unit or a primary optical unit group having a plurality of primary optical units arranged side by side, wherein the primary optical unit includes a light entrance portion 5 and a light guide portion, the light guide portion has a light entrance portion mounting surface and a primary light emission surface, the light entrance portion mounting surface is provided with at least one light entrance portion 5, the light entrance portion 5 is configured to enable incident light to be converged and emitted to the light guide portion, and the light guide portion is configured to guide the incident light to be emitted from the primary light emission surface; and a secondary optical unit 4, wherein the secondary optical unit 4 has a secondary light emission surface 41 and a secondary light entrance surface 42 corresponding to the primary light emission surface, and the secondary light emission surface 41 is a narrow and long smooth curved surface.

Since the secondary optical unit 4 may be fitted with one or more primary optical units, the secondary light emission surface 41 of the secondary optical unit 4 is a light emission surface of the whole vehicle lamp optical assembly; by configuring the secondary light emission surface 41 to be a narrow and long smooth curved surface without a section difference, and arranging the light entrance portion 5 and the light guide portion, a better converging effect can be achieved for light in the up-down direction, such that the up-down height of the secondary light emission surface 41 may be in the millimeter order, and the up-down heights of the light entrance portion 5 and the light guide portion may also be quite small, therefore, the overall up-down height of the vehicle lamp optical assembly can be quite small, so as to realize a miniaturization design of a small opening.

Wherein, the secondary light emission surface 41 may be a columnar curved surface. that is, a longitudinal sectional line of the secondary light emission surface 41 is an arc line protruding forwards, and a transverse sectional line of the secondary light emission surface 41 is a straight line extending in the left-right direction; or a transverse sectional line of the secondary light emission surface 41 is a curve extending in the left-right direction, and the secondary light emission surface 41 is formed by sweeping the longitudinal sectional line along the transverse sectional line thereof. The secondary light emission surface 41 has various shapes, high adaptability, so that shape requirements of different vehicle lamps may be met, and diversification design in shaping is realized.

Specifically, the primary optical unit is a low-beam inflection-point primary optical unit 1, a low-beam widening primary optical unit 2 or a high-beam primary optical unit 3, and the primary optical unit group includes at least one or more of the low-beam inflection-point primary optical unit 1, the low-beam widening primary optical unit 2 and the high-beam primary optical unit 3. The low-beam inflection-point primary optical unit 1 and the secondary optical unit 4 can be fitted to form a low-beam central region light shape a with a low-beam inflection-point cut-off line; the low-beam widening primary optical unit 2 and the secondary optical unit 4 can be fitted to form a low-beam widening region light shape c with a low-beam widening cut-off line; and the high-beam primary optical unit 3 and the secondary optical unit 4 can be fitted to form a high-beam light shape b, thereby achieving plural illumination functions independently or simultaneously to meet diversified design requirements of a vehicle lamp.

Figure 16:
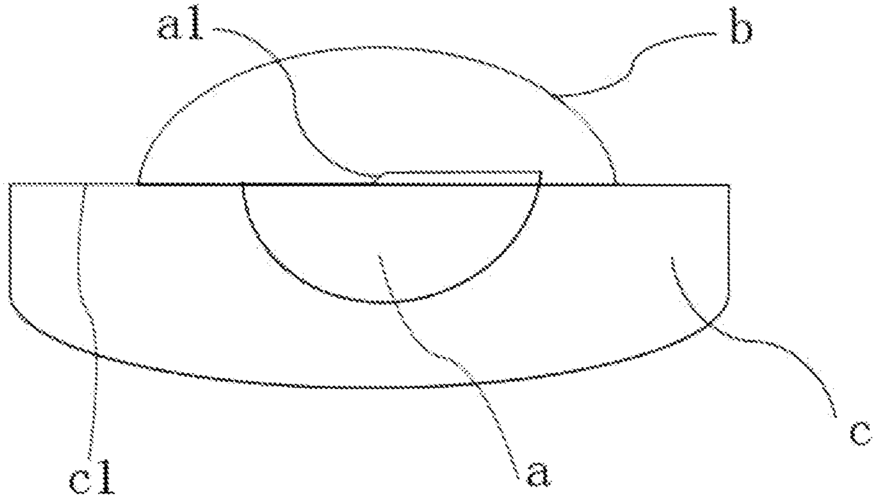
FIG. 16 is a schematic diagram of a light shape according to an embodiment of the present disclosure.

As a specific embodiment, as shown in FIGS. 1 to 10, the vehicle lamp optical assembly includes: a primary optical unit group composed of a low-beam inflection-point primary optical unit 1, a low-beam widening primary optical unit 2 and a high-beam primary optical unit 3; and one secondary optical unit 4. The low-beam widening primary optical unit 2 is provided between the low-beam inflection-point primary optical unit 1 and the high-beam primary optical unit 3. The vehicle lamp optical assembly can form three light shapes as shown in FIG. 16, wherein the low-beam inflection-point primary optical unit 1 and the secondary optical unit 4 are fitted to form a low-beam central region light shape a, and a1 in the drawing is a low-beam inflection-point cut-off line of the low-beam central region light shape a, which has an inflection point; the low-beam widening primary optical unit 2 and the secondary optical unit 4 are fitted to form a low-beam widening region light shape c, and c1 in the drawing is a low-beam widening cut-off line of the low-beam widening region light shape c, which is preferably a horizontal line; and the high-beam primary optical unit 3 and the secondary optical unit 4 are fitted to form a high-beam light shape b.

Since the functions to be achieved are different, the plurality of primary optical units are of different structures, and correspondingly, the secondary light entrance surfaces 42 corresponding to the primary optical units are also of different structures. Specific structures of the primary optical units will be described in detail below, and incidentally, the structure of the secondary light entrance surface 42 of the secondary optical unit 4 is described.

Specifically, the light guide portion of the low-beam inflection-point primary optical unit 1 is a low-beam light guide portion 11, the primary light emission surface thereof is a low-beam primary light emission surface 111, the secondary light entrance surface 42 corresponding to the low-beam primary light emission surface 111 includes four low-beam secondary light entrance surface 421, the low-beam secondary light entrance surface 421 is a curved surface protruding backwards, the low-beam secondary light entrance surfaces 421 are in one-to-one correspondence to the light entrance portions 5, and a low-beam inflection-point cut-off line structure 12 for forming a low-beam inflection-point cut-off line is provided on a front boundary of a lower surface of the low-beam light guide portion 11. By providing the low-beam inflection-point cut-off line structure 12 on the low-beam light guide portion 11, there is no need to additionally use a light screen to block and form a cut-off line, and meanwhile, there is no need to arrange a driving mechanism to drive the light screen to achieve switch of high and low beams, thus eliminating mechanical failure, reducing components and parts, simplifying the structure, achieving a small occupied space, and a higher space utilization efficiency and light distribution efficiency.

The shape of the low-beam secondary light entrance surface 421 may be obtained using a light refraction law and a curved surface fitting method according to parameters, such as the given secondary light emission surface 41, a focus, and the direction of emission light of the specific secondary light emission surface 41. The low-beam secondary light entrance surface 421 and a corresponding part of the secondary light emission surface 41 form a single focus together, so as to converge the light emitted from the low-beam primary light emission surface 111 in the up-down and left-right directions to form a low-beam inflection-point cut-off line with an inflection point.

Figure 9:
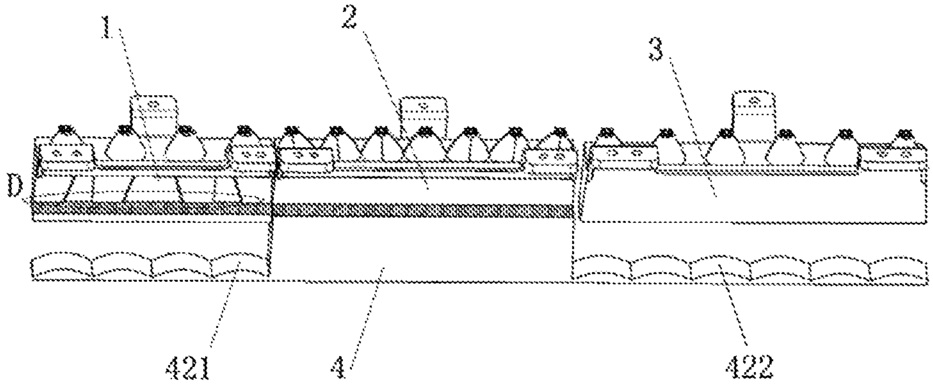
FIG. 9 is a fourth schematic back perspective structural diagram according to an embodiment of the present disclosure.
Figure 10:
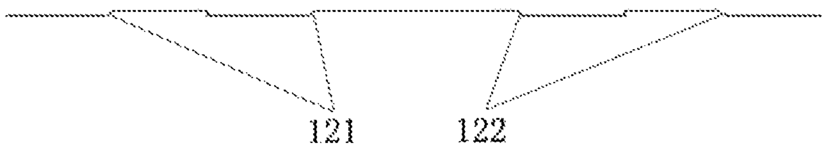
FIG. 10 is a schematic structural diagram of a corresponding low-beam inflection-point cut-off line structure at D in FIG. 9.

In order to meet different driving requirements, i.e., to achieve left-hand driving or right-hand driving requirements, low-beam inflection-point cut-off line structures 12 in different forms may be provided; for example, the low-beam inflection-point cut-off line structure 12 includes at least one left-hand-driving cut-off line structure 121 and at least one right-hand-driving cut-off line structure 122, and the left-hand-driving cut-off line structures 121 and the right-hand-driving cut-off line structures 122 are in one-to-one correspondence to the light entrance portions 5, as shown specifically in FIGS. 9 and 10. The low-beam inflection-point cut-off line structure 12 includes two left-hand-driving cut-off line structures 121 and two right-hand-driving cut-off line structures 122 connected in sequence. When light is emitted from a part of the low-beam primary light emission surface 111 corresponding to the left-hand-driving cut-off line structure 121, it will be intercepted by the left-hand-driving cut-off line structure 121, such that all the light is emitted above the left-hand-driving cut-off line structure 121, and then emitted by the secondary optical unit 4 to form a left-hand-driving low-beam central region light shape with a left-hand-driving low-beam inflection-point cut-off line; when the light is emitted from a part of the low-beam primary light emission surface 111 corresponding to the right-hand-driving cut-off line structure 122, it will be intercepted by the right-hand-driving cut-off line structure 122, such that all the light is emitted above the right-hand-driving cut-off line structure 122, and then emitted from the secondary optical unit 4 to form a right-hand-driving low-beam central region light shape with a right-hand-driving low-beam inflection-point cut-off line. Thus, by providing the left-hand-driving cut-off line structure 121 and the right-hand-driving cut-off line structure 122 in one vehicle lamp optical assembly, operations, such as dimming and light source switching, are performed according to actual requirements, such that a switch of left-hand driving and right-hand driving may be achieved, so as to meet the use of the vehicle lamp optical assembly for vehicle lamps in different regions around the world, and reduce redevelopment and design of the lamps. The number of the left-hand-driving cut-off line structure 121 and the number of the right-hand-driving cut-off line structure 122 may be set to one respectively, or may be set to a plurality according to the illuminance requirement of a low-beam central region, and they are preferably arranged at corresponding focuses thereof.

Figure 11:
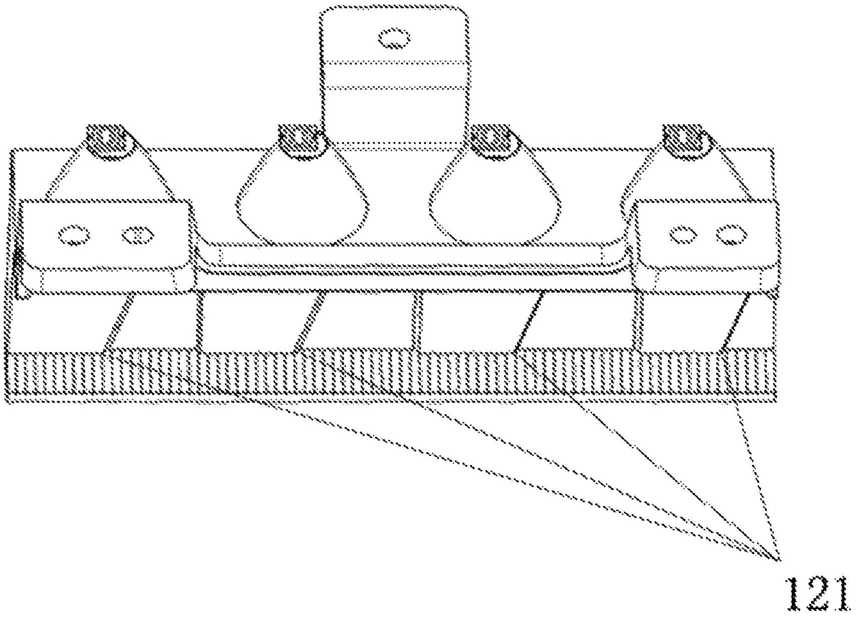
FIG. 11 is a schematic diagram of a low-beam inflection-point cut-off line structure of a low-beam inflection-point primary optical unit in an embodiment of the present disclosure.
Figure 12:
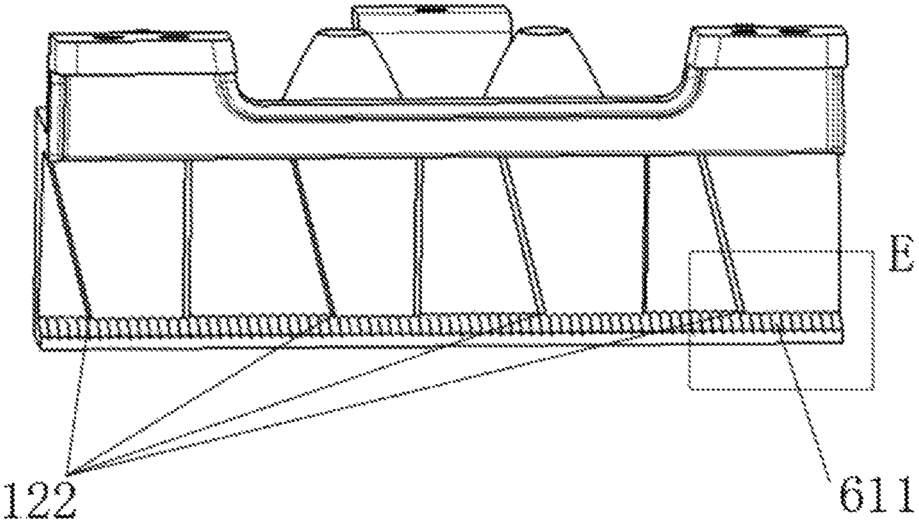
FIG. 12 is a schematic diagram of another low-beam inflection-point cut-off line structure of a low-beam inflection-point primary optical unit in an embodiment of the present disclosure.

In addition, a plurality of identical left-hand-driving cut-off line structures 121 or right-hand-driving cut-off line structures 122 may be sequentially arranged in the left-right direction, and each of light source switches corresponding to the left-hand-driving cut-off line structures 121 or right-hand-driving cut-off line structures 122 is independently controlled to realize horizontal movement of the low-beam inflection-point cut-off line, i.e., movement of a low-beam inflection point, for implementing an adaptive front lighting system (AFS). Specifically, as shown in FIGS. 11 and 12, the low-beam inflection-point cut-off line structure 12 in FIG. 11 includes four left-hand-driving cut-off line structures 121 connected in sequence, four light entrance portions 5 corresponding to the left-hand-driving cut-off line structures 121 are provided on the light entrance portion mounting surface of the low-beam light guide portion 11, light sources are provided at light entrance ends of the respective light entrance portions 5, and adaptive front lighting is realized by independently controlling each of the light sources to be turned on or off. The low-beam inflection-point cut-off line structure 12 in FIG. 12 includes four right-hand-driving cut-off line structures 122 connected in sequence, and similarly, four light entrance portions 5 corresponding to the right-hand-driving cut-off line structures 122 are provided on the light entrance portion mounting surface of the low-beam light guide portion 11, light sources are provided at light entrance ends of the respective light entrance portions 5, and adaptive front lighting is realized by independently controlling the light sources to be turned on or off.

Figure 5:
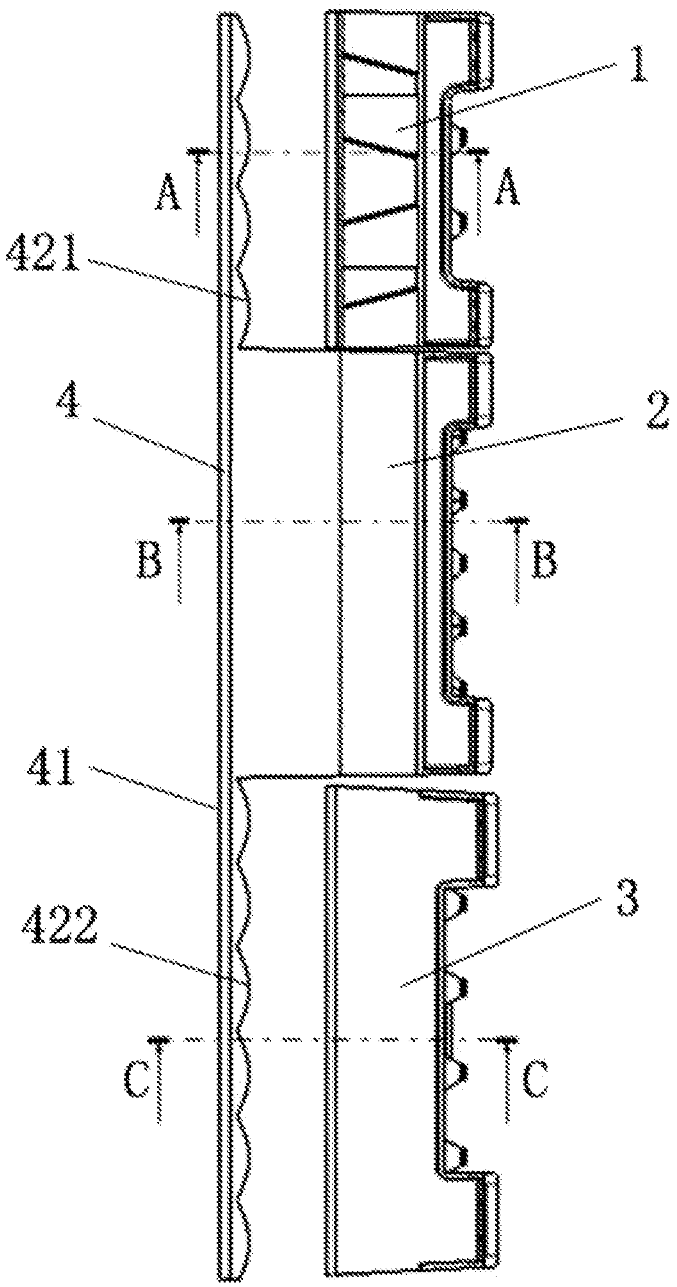
FIG. 5 is a bottom view of FIG. 1.
Figure 6:
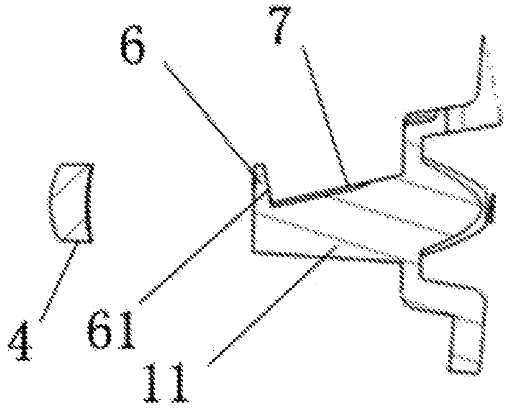
FIG. 6 is a sectional view taken along A-A of FIG. 5.

More specifically, as shown in FIGS. 5 and 6, a III-region structure 6 for forming a low-beam III-region light shape is provided at a lower portion of a front end of the low-beam light guide portion 11. The III-region structure 6, a lower surface of the low-beam light guide portion 11 and a rear end of the low-beam light guide portion 11 form an upwardly concave groove 7, and the low-beam inflection-point cut-off line structure 12 is formed at a junction between the III-region structure 6 and a top of the groove 7. Thus, a part of light emitted by the light entrance portion 5 enters the low-beam light guide portion 11 and is intercepted by the low-beam inflection-point cut-off line structure 12, then is projected by the secondary optical unit 4 again to form the low-beam central region light shape a with the low-beam inflection-point cut-off line; the other part of the light emitted by the light entrance portion 5 directly enters the III-region structure 6 through the groove 7 and is projected by the secondary optical unit 4 to form the low-beam III-region light shape.

Figure 7:
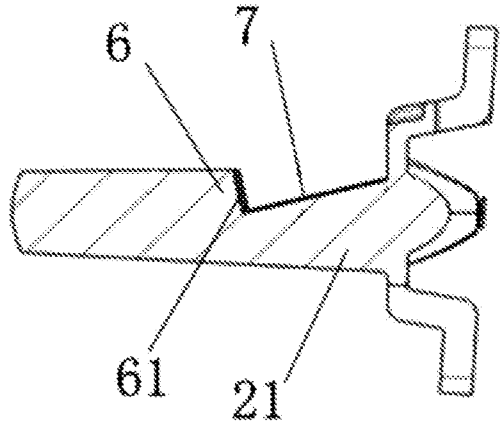
FIG. 7 is a sectional view taken along B-B of FIG. 5.
Figure 8:
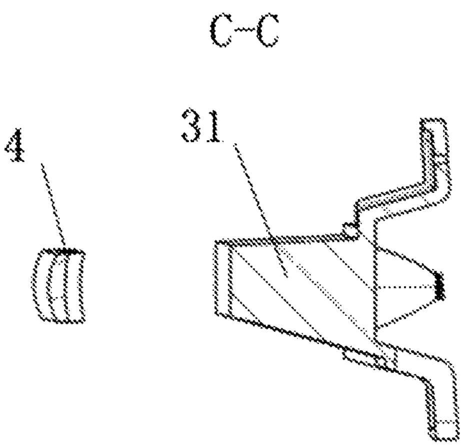
FIG. 8 is a sectional view taken along C-C of FIG. 5.

Specifically, as shown in FIGS. 5 and 7, the light guide portion of the low-beam widening primary optical unit 2 is a low-beam widening light guide portion 21. Since the low-beam widening cut-off line of the low-beam widening region light shape c is a horizontal line without an inflection point, and a corresponding part of the secondary optical unit 4 may not have a single focus, but have a focal line composed of several focuses, that is, it is not required to provide the secondary light entrance surface 42 protruding rearwards, and therefore, in order to facilitate mounting of the vehicle lamp optical assembly and to make the structure more compact, the low-beam widening light guide portion 21 and the secondary optical unit 4 are preferably connected into a whole, a low-beam widening cut-off line structure for forming the low-beam widening cut-off line is provided on a lower surface of the low-beam widening light guide portion 21, and the low-beam widening cut-off line structure is preferably provided on the above-mentioned focal line.

Similarly, a III-region structure 6 for forming a low-beam III-region light shape is provided at a lower portion of a front end of the low-beam widening light guide portion 21. The III-region structure 6, a lower surface of the low-beam widening light guide portion 21 and a rear end of the low-beam widening light guide portion 21 form an upwardly concave groove 7, and the low-beam widening cut-off line structure is formed at a junction between the III-region structure 6 and a top of the groove 7. Thus, a part of light emitted by the light entrance portion 5 enters the low-beam widening light guide portion 21 and is intercepted by the low-beam widening cut-off line structure, then is projected by the secondary optical unit 4 again to form the low-beam widening region light shape c with the low-beam widening cut-off line; the other part of the light emitted by the light entrance portion 5 directly enters the III-region structure 6 through the groove 7 and is projected by the secondary optical unit 4 to form the low-beam III-region light shape.

Specifically, the light guide portion of the high-beam primary optical unit 3 is a high-beam light guide portion 31, the primary light emission surface thereof is a high-beam primary light emission surface 311, the secondary light entrance surface 42 corresponding to the high-beam primary light emission surface 311 includes six high-beam secondary light entrance surfaces 422, the high-beam secondary light entrance surfaces 422 are curved surfaces protruding backwards, and the high-beam secondary light entrance surfaces 422 are in one-to-one correspondence to the light entrance portions 5. Thus, the light emitted from the light entrance portion 5 enters the high-beam light guide portion 31 and is projected by the secondary optical unit 4 to form the high-beam light shape. In high beam illumination, road surface condition, and whether pedestrians or vehicles exist in a lane ahead or on the other side may be sensed by automobile sensors. Since the high-beam primary optical unit 3 is provided with the plurality of light entrance portions 5, and correspondingly, the light entrance ends of the light entrance portions 5 are correspondingly provided with the light sources, and light emitted by the light sources has different irradiation regions, an irradiation region of the vehicle lamp may be controlled by controlling the respective light sources to be turned on or off, so as to avoid a region where a facing movement vehicle is located, and a dazzling problem is avoided, thereby achieving an intelligent anti-dazzling effect, that is, realizing an adaptive driving beam (ADB), wherein the number of the light sources is determined by pixels of the ADB required to be implemented.

The shape of the high-beam secondary light entrance surface 422 may be obtained using a light refraction law and a curved surface fitting method according to parameters, such as the given secondary light emission surface 41, a focus, and the direction of emission light of the specific secondary light emission surface 41. In addition, it should be noted that the high-beam light guide portion 31 is different from the low-beam light guide portion 11 in that emission light of the primary light emission surfaces thereof has different directions to form corresponding light shapes, and since the low-beam light shape should be located below the high-beam light shape on a light distribution screen, in the present embodiment, the low-beam inflection-point cut-off line structure 12 is provided on the front boundary of the lower surface of the low-beam light guide portion 11, such that all the emission light of the light entrance portion 5 may be emitted above the low-beam inflection-point cut-off line structure 12, and projected by the secondary optical unit 4 to form the low-beam central region light shape a located below the high-beam light shape b.

The above-mentioned low-beam inflection-point primary optical unit 1, the low-beam widening primary optical unit 2, and the high-beam primary optical unit 3 may be arranged separately or integrally by connecting. The separate arrangement facilitates dimming among the primary optical units, and the integral arrangement facilitates an improvement of positioning and mounting precision among the primary optical units.

As another embodiment, the light guide portions of the plurality of primary optical units in the primary optical unit group are connected into a whole, an auxiliary light source is provided on at least one side of the primary optical unit or the primary optical unit group in the left-right direction of the light guide portion, and when the auxiliary light source is turned on, light emitted by the auxiliary light source enters from a side surface of the light guide portion and is emitted from the primary light emission surface, finally is emitted through the secondary light emission surface 41. The auxiliary light source may be provided to achieve a daytime running light function or a low-beam III-region function by adjusting the luminous flux of the auxiliary light source. During the application to the daytime running light function, only the auxiliary light source is turned on, and the secondary light emission surface 41 emits light when viewed from the outside; that is, the secondary light emission surface 41 is overall lightened, so as to realize a whole lamp lightening effect to achieve the daytime running light function. During the application to the low-beam III-region function, the auxiliary light source and the light source corresponding to the light entrance portion 5 are turned on simultaneously, and the emission light of the auxiliary light source may, independently or jointly with light incident from a III-region light entrance surface 61, realize the illuminance and angle of the low-beam III-region light shape which meet regulatory requirements.

Figure 14:
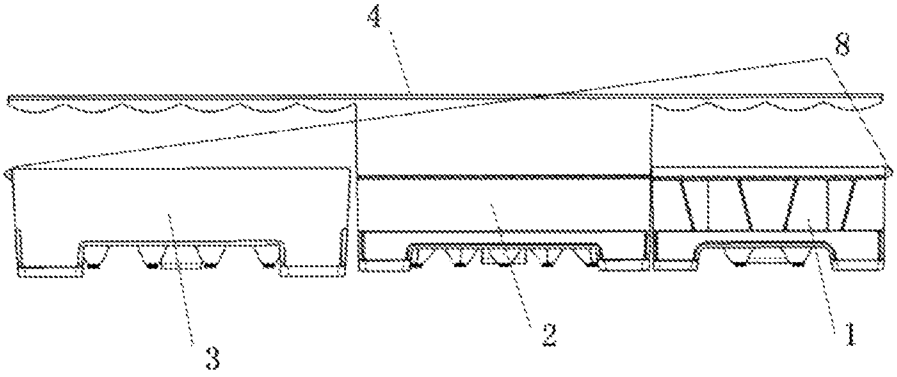
FIG. 14 is a first schematic structural diagram according to another embodiment of the present disclosure.
Figure 15:
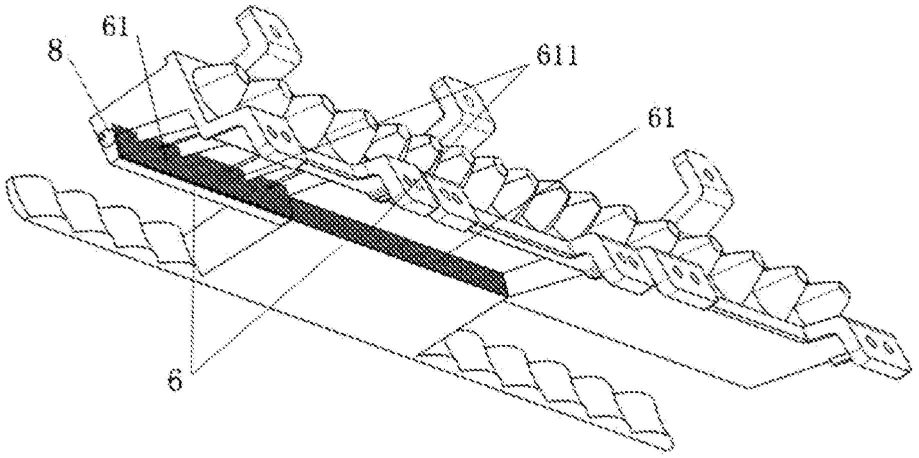
FIG. 15 is a second schematic structural diagram according to another embodiment of the present disclosure.

Specifically, as shown in FIGS. 14 and 15, the vehicle lamp optical assembly includes: a primary optical unit group composed of a low-beam inflection-point primary optical unit 1, a low-beam widening primary optical unit 2, and a high-beam primary optical unit 31 and one secondary optical unit 4, wherein the low-beam widening primary optical unit 2 is provided between the low-beam inflection-point primary optical unit 1 and the high-beam primary optical unit 3, the light guide portions of the low-beam inflection-point primary optical unit 1, the low-beam widening primary optical unit 2 and the high-beam primary optical unit 3 are connected into a whole, auxiliary light sources are provided on two sides of the integrally connected light guide portions in the left-right direction respectively, a light converging structure 8 is provided between the auxiliary light source and the light guide portion. By providing the light converging structure 8, more light can enter from the side surface of the light guide portion thereby improving a light utilization rate of the light sources on the two sides. The light converging structure

8 may be a light converging cup structure or a convex structure protruding towards the direction of the auxiliary light source.

Figure 13:
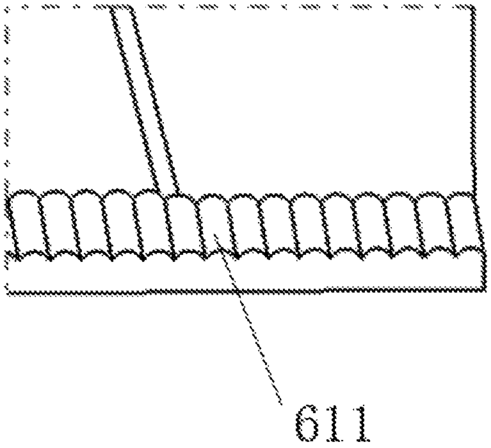
FIG. 13 is a schematic enlarged structural diagram at E in FIG. 12.

Preferably, the auxiliary light source is provided on one side of the III-region structure 6 of the low-beam light guide portion 11, concave-convex structures 611 are provided on the III-region light entrance surfaces 61 of the low-beam light guide portion 11 and the low-beam widening light guide portion 21, and the concave-convex structure 611 may be a striped concave-convex structure as shown in FIGS. 12 and 13, a grid-shaped concave-convex structure, or a zigzag concave-convex structure. On the one hand, the concave-convex structure 611 may diffuse the light emitted from the III-region light entrance surface 61, so as to improve uniformity of the low-beam III-region light shape; on the other hand, when the auxiliary light sources on two sides are turned on, the light emitted by the auxiliary light sources enters from the side surfaces of the light guide portions and is reflected by the III-region light entrance surface 61, then is emitted from the primary light emission surface. The arrangement of the concave-convex structure 611 may enable more light emitted by the auxiliary light sources to be fully reflected, emitted from the primary light emission surface, and uniformly emitted to the secondary light emission surface 41, so as to achieve effects of uniform illumination and an improved light utilization ratio.

On the basis of the above embodiments, the light entrance portion 5 is preferably of a light converging cup structure, and may better converge light in the up-down and left-right directions. An outer contour surface of the light entrance portion 5 is a curved surface with a diameter gradually increased from rear to front, and is a solid body having a light entrance surface and a light emission surface located at the front and rear ends thereof. The light entrance surface and the light emission surface may be flat surfaces or curved surfaces; or, the outer contour surface of the light entrance portion 5 is a curved surface with the diameter gradually increased from rear to front, the interior of which is provided with a cavity structure recessed forwards, and a protrusion protruding backwards is provided within the cavity; or, the light entrance portion 5 is of a convex structure protruding backwards.

Preferably, each of an upper surface and a lower surface of the light guide portion is provided with a concave or convex pattern structure, such that more light emitted from the light guide portion may be reflected to the primary light emission surface by the upper surface and the lower surface of the light guide portion, thus improving a light utilization efficiency; or the whole or part of the upper surface and the lower surface of the light guide portion is provided with a plated film, so as to improve reflectivity of the light inside the light guide portion. The plated film may be aluminum plated or silver plated. Furthermore, a refraction condition of the light refracted by the groove 7 may be improved by adjusting the vertical height of the above-mentioned groove 7 and the inclination directions and gradients of front and back sidewalls.

A second aspect of the present disclosure further provides a vehicle lamp module, including the vehicle lamp optical assembly according to the first aspect and at least one light source, wherein the light sources are in one-to-one correspondence to the light entrance portions 5.

Preferably, optical axis of the light source coincides with optical axis of the light entrance portion 5 or there is a horizontal included angle between, wherein the horizontal included angle is preferably 0° to 15°. By forming the horizontal deflection angle of 0° to 15° between the optical axis of the light source and the optical axis of the light entrance portion 5, the emission light of the light source is emitted to the left side and the right side of the vehicle lamp module, thus achieving the effect of light shape extension in the horizontal direction.

Preferably, each of the light sources can be independently controlled to be turned on or off, such that during high beam illumination, an irradiation region of the vehicle lamp is controlled by controlling the light sources to be turned on or off, so as to avoid a region where a facing movement vehicle is located, and a dazzling problem is avoided, thereby achieving an intelligent anti-dazzling effect.

The arrangement of the vehicle lamp optical assembly can realize the design of size miniaturization and shape diversification.

A third aspect of the present disclosure further provides a vehicle lamp, including the vehicle lamp module according to the second aspect.

By arranging the vehicle lamp module, the vehicle lamp can realize the design of size miniaturization and shape diversification.

A fourth aspect of the present disclosure further provides a vehicle, including the vehicle lamp according to the third aspect.

By arranging the vehicle lamp, the vehicle can realize the design of shape diversification, which is favorable to an improvement of the overall visual effect and attractiveness of a vehicle body.

In summary, in the present disclosure, the design of miniaturization and diversification in size and shape can be realized by arranging the narrow and long secondary light emission surface 41; the present disclosure may realize low beam illumination and high beam illumination, has the functions of ADB (adaptive driving beam), AFS (adaptive front lighting system) and daytime running light, and has the characteristics of a simple structure and diversified functions; the low-beam inflection-point cut-off line structure 12 may meet the left-hand-driving and right-hand-driving requirements independently or simultaneously, such that it is realized that vehicles in different regions around the world share the same lamp system, thus avoiding repeated development and design of lamps. The vehicle lamp optical assembly according to the present disclosure may be directly applied to the vehicle body without an external lens, thus improving an optical efficiency, improving the visual effect in shape, and meeting the requirements of miniaturization, a high efficiency and a novel shape of a current vehicle lamp.

The preferred embodiments of the present disclosure have been described in detail with reference to the accompanying drawings; however, the present disclosure is not limited to the specific details of the above embodiments, and various simple modifications may be made to the technical solutions of the present disclosure within the technical idea of the present disclosure, and these simple modifications all fall within the protection scope of the present disclosure.

In addition, it should be noted that various technical features described in the above embodiments may be combined in any suitable manner without contradiction, and in order to avoid unnecessary repetition, various possible combinations will not be described separately in the present disclosure.

Furthermore, any combination of various embodiments of the present disclosure may be made and should be considered as the disclosure of the present disclosure as long as the idea of the present disclosure is not violated.

What is claimed is:

1. A vehicle lamp optical assembly, comprising:

a primary optical unit or a primary optical unit group having a plurality of primary optical units arranged side by side, wherein the primary optical unit comprises a light entrance portion and a light guide portion, the light guide portion has a light entrance portion mounting surface and a primary light emission surface, the light entrance portion mounting surface is provided with at least one light entrance portion, the light entrance portion is configured to enable incident light to be converged and emitted to the light guide portion, and the light guide portion is configured to be capable of guiding the incident light to be emitted from the primary light emission surface; and a secondary optical unit, wherein the secondary optical unit has a secondary light emission surface and a secondary light entrance surface corresponding to the primary light emission surface, and the secondary light emission surface is a narrow and long smooth curved surface; and wherein the primary optical unit is a low-beam inflection-point primary optical unit, a low-beam widening primary optical unit or a high-beam primary optical unit, and the primary optical unit group comprises at least one or more of the low-beam inflection-point primary optical units, the low-beam widening primary optical units and the high-beam primary optical units.

2. The vehicle lamp optical assembly according to claim 1, wherein the light guide portions of the plurality of primary optical units in the primary optical unit group are connected into a whole, an auxiliary light source is provided on at least one side of the primary optical unit or the primary optical unit group in left-right direction of the light guide portion, and light emitted by the auxiliary light source enters from a side surface of the light guide portion and is emitted from the primary light emission surface.

3. The vehicle lamp optical assembly according to claim 2, wherein a light converging structure is provided between the auxiliary light source and the light guide portion.

4. The vehicle lamp optical assembly according to claim 1, wherein a longitudinal sectional line of the secondary light emission surface is an arc line protruding forwards, and a transverse sectional line of the secondary light emission surface is a straight line or a curve extending in left-right direction.

5. The vehicle lamp optical assembly according to claim 1, wherein the light entrance portion is of a light converging cup structure, and an outer contour surface of the light entrance portion is a curved surface with a diameter gradually increased from rear to front.

6. The vehicle lamp optical assembly according to claim 1, wherein each of an upper surface and a lower surface of the light guide portion is provided with a pattern structure or a plated film.

7. The vehicle lamp optical assembly according to claim 1, wherein the primary optical unit group comprises a low-beam inflection-point primary optical unit, a low-beam widening primary optical unit, and a high-beam primary optical unit, and the low-beam widening primary optical unit is provided between the low-beam inflection-point primary optical unit and the high-beam primary optical unit.

8. The vehicle lamp optical assembly according to claim 1, wherein the light guide portion of the low-beam inflection-point primary optical unit is a low-beam light guide portion, the primary light emission surface of the low-beam light guide portion is a low-beam primary light emission surface, the secondary light entrance surface corresponding to the low-beam primary light emission surface comprises at least one low-beam secondary light entrance surface, the low-beam secondary light entrance surface is a curved surface protruding backwards, the low-beam secondary light entrance surfaces are in one-to-one correspondence to the light entrance portions, and a low-beam inflection-point cut-off line structure for forming a low-beam inflection-point cut-off line is provided on a front boundary of a lower surface of the low-beam light guide portion.

9. The vehicle lamp optical assembly according to claim 8, wherein the low-beam inflection-point cut-off line structure comprises at least one left-hand-driving cut-off line structure, or at least one right-hand-driving cut-off line structure, or at least one left-hand-driving cut-off line structure and at least one right-hand-driving cut-off line structure, and the left-hand-driving cut-off line structures and the right-hand-driving cut-off line structures are in one-to-one correspondence to the light entrance portions.

10. The vehicle lamp optical assembly according to claim 9, wherein a III-region structure for forming a low-beam III-region light shape is provided at a lower portion of a front end of the low-beam light guide portion, the III-region structure, a lower surface of the low-beam light guide portion and a rear end of the low-beam light guide portion form an upwardly concave groove, and the low-beam inflection-point cut-off line structure is formed at a junction between the III-region structure and a top of the groove.

11. The vehicle lamp optical assembly according to claim 1, wherein the light guide portion of the low-beam widening primary optical unit is a low-beam widening light guide portion, the low-beam widening light guide portion and the secondary optical unit are connected into a whole, and a low-beam widening cut-off line structure for forming a low-beam widening cut-off line is provided on a lower surface of the low-beam widening light guide portion.

12. The vehicle lamp optical assembly according to claim 11, wherein a III-region structure for forming a low-beam III-region light shape is provided at a lower portion of a front end of the low-beam widening light guide portion, the III-region structure, a lower surface of the low-beam widening light guide portion and a rear end of the low-beam widening light guide portion form an upwardly concave groove, and the low-beam widening cut-off line structure is formed at a junction between the III-region structure and a top of the groove.

13. The vehicle lamp optical assembly according to claim 1, wherein the light guide portion of the high-beam primary optical unit is a high-beam light guide portion, the primary light emission surface of the high-beam light guide portion is a high-beam primary light emission surface, the secondary light entrance surface corresponding to the high-beam primary light emission surface comprises at least one high-beam secondary light entrance surface, the high-beam secondary light entrance surface is a curved surface protruding backwards, and the high-beam secondary light entrance surfaces are in one-to-one correspondence to the light entrance portions.

14. The vehicle lamp optical assembly according to claim 1, wherein the primary optical unit is a low-beam inflection-point primary optical unit, a low-beam widening primary optical unit or a high-beam primary optical unit, and the primary optical unit group comprises at least one or more of the low-beam inflection-point primary optical units, the low-beam widening primary optical units and the high-beam primary optical units; the light guide portion of the low-beam inflection-point primary optical unit is a low-beam light guide portion, the light guide portion of the low-beam widening primary optical unit is a low-beam widening light guide portion, a III-region structure for forming a low-beam III-region light shape is provided at each of lower portions of front ends of the low-beam light guide portion and the low-beam widening light guide portion, and a concave-convex structure is provided on a III-region light entrance surface of the III-region structure.

15. The vehicle lamp optical assembly according to claim 14, wherein an auxiliary light source is provided on a side surface of the III-region structure of the low-beam light guide portion or the low-beam widening light guide portion.

16. A vehicle lamp module, comprising the vehicle lamp optical assembly according to claim 1 and at least one light source, wherein the light sources are in one-to-one correspondence to the light entrance portions.

17. The vehicle lamp module according to claim 16, wherein each of the light sources can be independently controlled to be turned on or off.

18. A vehicle lamp, comprising the vehicle lamp module according to claim 16.

19. The vehicle lamp according to claim 18, wherein each of the light sources can be independently controlled to be turned on or off.

* * * * *